Dec. 17, 1929. C. F. CAMERON 1,740,224
STORE FRONT CONSTRUCTION
Filed Dec. 12, 1927
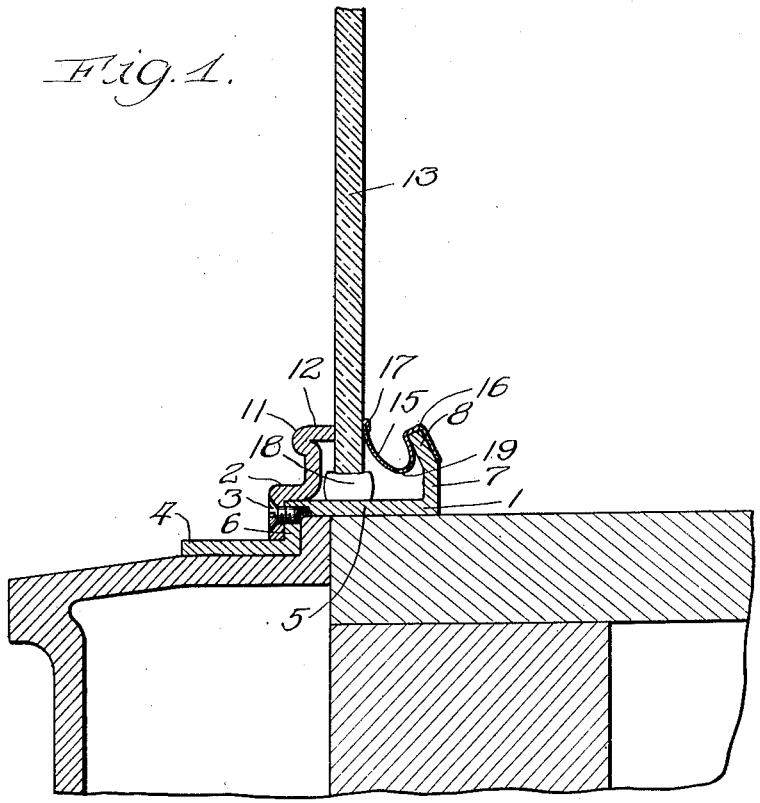
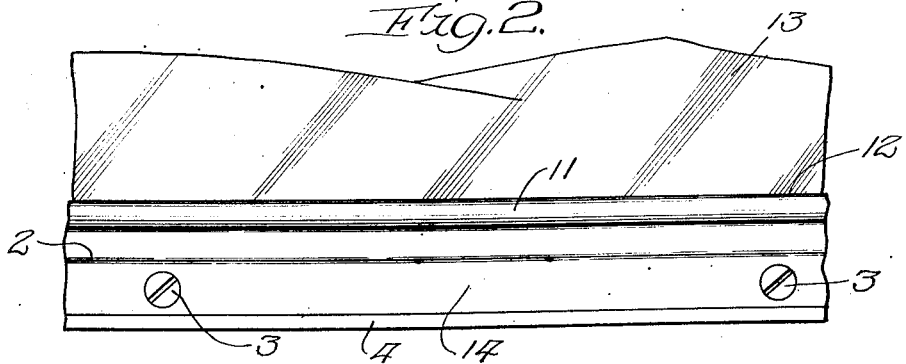
Inventor:
Carl F. Cameron,
By Wallace R. Lane
Atty.

Patented Dec. 17, 1929

1,740,224

UNITED STATES PATENT OFFICE

CARL F. CAMERON, OF NILES, MICHIGAN, ASSIGNOR TO THE KAWNEER COMPANY, OF NILES, MICHIGAN, A CORPORATION OF MICHIGAN

STORE-FRONT CONSTRUCTION

Application filed December 12, 1927. Serial No. 239,297.

This invention relates to store front constructions, and more particularly to the provision of a metallic construction which will be strong, durable, and self-contained so that it may be used by itself without requiring the use of other reinforcing materials, thus minimizing expense otherwise involved for material and installation when used in store front constructions.

Among the objects of my invention are to provide a store front construction of the character in which the window or plate glass is firmly, yet yieldably held in place so as to permit expansion and contraction of the plate glass and of the allied parts. It is desirable in store front constructions to connect the members which hold the pane of glass with an amount of pressure sufficient to hold the glass firmly in place and yet not enough to place the glass under a strain which will make the glass susceptible to splitting or cracking when it is subjected to vibration or pressure from external sources.

Another object is to provide a strong yet relatively light construction, simple in form and embodying a minimum number of parts which will securely hold the glass and at the same time allow the glass to be readily removed and replaced by a new one. A further object is to provide a structure whereby the installation of heavy plate glass may be effected quickly, easily and economically, the structure being of maximum simplicity, efficiency, economy and ease of operation; and such further objects, advantages and capabilities as will later more fully appear.

My invention further resides in the combination, construction and arrangement of parts illustrated in the accompanying drawings, and while I have shown therein a preferred embodiment, I desire it to be understood that the same is susceptible of modification and change, without departing from the spirit of my invention.

In the drawings:

Fig. 1 is a transverse sectional view showing my invention applied to a store window.

Fig. 2 is a fragmentary front elevation.

Fig. 3 is a transverse sectional view of the front and rear rigid members and disclosing method of combining the same.

Referring to the drawings, the inner or pane seating section 1 is of metal of suitable gauge. An outer or front member 2 is suitably attached to the inner or pane seating section 1, the means of attachment shown in the drawings being a plurality of screws 3 spaced at intervals along the front surface of the member 2. Both the members 1 and 2 are of rigid construction and may be of extruded bronze, iron, steel, heavy rolled copper mouldings or other suitable material that is substantially rigid.

The inner or seating section 1 is of open construction and comprises base members 4 and 5, a shoulder 6, and an upright or rear section 7. The section 7 at its upper end is provided with an upwardly and inwardly extending flange 8, the purpose of which will be later more fully explained. The outer or front member 2 is provided with a downwardly extending portion 9, having at its upper part a curved shoulder 10 adapted to seat upon and engage with the vertical section or shoulder 6 of the member 1. The upper portion of the member 2 is rounded throughout its length as shown at 11, and is provided with an inwardly extending flange 12 providing an abutting surface for engagement with the window or pane of glass 13. The vertical extensions or sections 9 and 6 are provided with openings adapted for the reception of the screws 3, the openings in the extension or section 9 being counter-sunk as clearly shown in Fig. 1. These extensions or sections are further provided with perforations or openings 14 for suitably draining the water produced by condensation on the face of the glass or which will run down the same when washed.

An intermediate member 15 is provided with a U-shaped portion 16, the purpose of the U-shaped portion being to fit over the flange 8 of the member 1. This construction allows for the ready seating of the intermediate member and for holding the same in detachable position. The inner portion of the member 15 is of compound curved shape in cross-section, the upper rolled or beaded end 17 adapted to abut against the inner surface of the glass 13. The member 15 is constructed of yieldable or resilient material that not only holds the glass in place, but allows for the resilient features necessary to permit expansion and contraction of the plate glass and holds the glass with an amount of pressure sufficient to hold the glass firmly in place and yet not permit the same to an undue strain, when the glass is subjected to vibration or pressure. My construction allows for these resilient features along with the rigid front and rear setting.

Any suitable supports or cushions 18 are provided on the member 1 for the glass 13 to rest against or upon. Such supports or cushions may be made of leather, rubber or other suitable resilient material.

Drain openings 19 are provided in the lower portion of the member 15 for draining the condensation that may accumulate on the window or for draining off the water when the inner surface of the window is being washed.

After the glass 13 has been mounted upon the blocks 18 on the member 1 and the members 1 and 2 have been brought in tight engagement by means of the screws 3, the resilient or yieldable member 15 is placed or anchored in the position shown in Fig. 1, by the snapping of the U-shaped section 16 over the flange 8 of the inner member 1. The glass is thus yieldably supported not only by the cushions or supporting members 18, but by the resilient member or molding 15. While the glass is firmly clamped in place, a certain amount of yielding movement is permitted which will tend to prevent the glass from being broken under wind pressure or other stresses and which will permit not only expansion and contraction of the glass itself, but the metal framing parts.

Having thus disclosed my invention, I claim:

1. In a store front construction, the combination of front and rear rigid members and a resilient member adapted to snap on one of said rigid members and to project against the pane for holding said pane in yieldable relation with the other of said rigid members.

2. In a store front construction, the combination of front and rear rigid members and a resilient member adapted to snap on said rear member and to project against the pane for holding said pane in yieldable relation with the front rigid member.

3. In a store front construction, the combination of a pane-seating section having a rear part provided with an inwardly and upwardly extending flange, a front section having detachable engagement with said pane-seating section, and a resilient member mounted on said flange and adapted to bear against the pane for holding said pane in yieldable relation with said front section.

4. In a store front construction, the combination of a pane-seating member provided with an upwardly and inwardly extending flange, a front member having engagement with said pane-seating member and provided with an inwardly projecting flange, and a resilient member mounted on said first named flange and adapted to project against the pane for holding said pane in yieldable relation with said inwardly projecting flange.

5. In a store front construction, the combination of a pane-seating member provided with an upwardly and inwardly extending flange, a front member having detachable engagement with said pane-seating member and having an inwardly projecting flange providing an abutting surface for the pane, and a resilient member anchored on said upwardly extending flange and adapted to yieldably engage said pane and hold the same in engagement with said abutting surface.

6. In a store front construction, a pair of rigid members and a resilient member adapted to snap on one of said rigid members and to project against the pane for holding said pane in yieldable relation with the other of said rigid members.

7. In a store front construction, the combination of a pane-seating section provided with a flange, a front section having engagement with said pane-seating section, and a member mounted on said flange and adapted to bear against the pane for holding said pane in yieldable relation with said front section.

8. In a store front construction, the combination of a pane seating section provided with a flange, a front section in detachable engagement with said pane-seating section, and a resilient member mounted on said flange and adapted to bear against the pane for holding said pane in yieldable relation with said front section.

9. In a store front construction, the combination of a pane-seating section and a front section, an upstanding portion on one of said sections, and a resilient member mounted on said upstanding portion and adapted to project against the pane for holding said pane in yieldable relation with the other of said sections.

10. In a store front construction, the combination of a pane-seating section and a front section, an upstanding portion on said pane-seating section and a resilient member mounted on said upstanding portion and adapted to project against the pane for holding said pane in yieldable relation with said front section.

11. In a store front construction, a pair of rigid members, one of said members being provided with a flange, and a resilient member mounted on said flange and adapted to project against the pane for holding said pane in yieldable relation with the other of said rigid members.

12. In a store front construction, a pair of rigid members provided with inwardly extending portions and a resilient member engaging one of said inwardly extending portions and adapted to project against the pane for holding said pane in yieldable relation with the other of said portions.

In witness whereof, I hereunto subscribe my name to this specification.

CARL F. CAMERON.